United States Patent [19]

Shimura et al.

[11] Patent Number: 4,914,295
[45] Date of Patent: * Apr. 3, 1990

[54] RADIATION IMAGE READ-OUT AND IMAGE SIGNAL STORING APPARATUS

[75] Inventors: Kazuo Shimura; Masamitsu Ishida, both of Kanagawa, Japan

[73] Assignee: Fuji Photo Film Co., Ltd., Kanagawa, Japan

[*] Notice: The portion of the term of this patent subsequent to Oct. 6, 2005 has been disclaimed.

[21] Appl. No.: 302,992

[22] Filed: Jan. 30, 1989

Related U.S. Application Data

[63] Continuation of Ser. No. 877,450, Jun. 23, 1986, abandoned.

[30] Foreign Application Priority Data

Jun. 25, 1985 [JP] Japan .................................. 60-138793
Jun. 25, 1985 [JP] Japan .................................. 60-138794

[51] Int. Cl.$^4$ .............................................. G01T 1/105
[52] U.S. Cl. .............................. 250/327.2; 250/484.1
[58] Field of Search ...................... 250/327.2, 484.1; 364/413.13, 413.26

[56] References Cited

U.S. PATENT DOCUMENTS 4,620,098 10/1986 Fujiwara .......................... 250/327.2
4,638,162 1/1987 Tanaka et al. ...................... 364/414
4,804,841 2/1989 Nakajima et al. ................. 250/327.2

Primary Examiner—Janice A. Howell
Assistant Examiner—Richard Hanig
Attorney, Agent, or Firm—Sixbey, Friedman, Leedom & Ferguson

[57] ABSTRACT

An apparatus for photoelectrically detecting a radiation image of an object stored on a stimulable phosphor sheet by exposure to a radiation passing through the object and storing detected image signals comprises a circuit for recognizing an irradiation field on the stimulable phosphor sheet, and an image signal selection circuit for receiving irradiation field information generated by the irradiation field recognition circuit and selecting only the image signals inside of the irradiation field from the read-out image signals. Or, the apparatus comprises a section for creating a histogram of the read-out image signals, a histogram analysis section for determining a range of the read-out image signals outside of a peak region arising in the vicinity of the maximum signal value or the minimum signal value in the histogram, and an image signal selection circuit for receiving the output of the histogram analysis section and selecting only the image signals within the range from the read-out image signals.

5 Claims, 5 Drawing Sheets

READ-OUT IMAGE SIGNAL
(LEVEL OF STORED RADIATION ENERGY)

F I G. 6

READ-OUT IMAGE SIGNAL
(LEVEL OF STORED RADIATION ENERGY)

RADIATION IMAGE READ-OUT AND IMAGE SIGNAL STORING APPARATUS

This application is a continuation of application Ser. No. 877,450, filed June 23, 1986, now abandoned.

BACKGROUND OF THE INVENTION

1. Field of the Invention

This invention relates to a radiation image read-out apparatus for exposing a stimulable phosphor sheet having a radiation image stored thereon to stimulating rays which cause it to emit light in proportion to the stored radiation energy, photoelectrically detecting the emitted light, and obtaining a read-out image signal for use in reproduction of a visible image. This invention particularly relates to a radiation image read-out apparatus provided with a storage means for storing the read-out image signal in an image file, i.e. a radiation image read-out and image signal storing apparatus.

2. Description of the Prior Art

When certain kinds of phosphors are exposed to a radiation such as X-rays, α-rays, β-rays γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

In the aforesaid radiation image recording and reproducing system, image signals may be directly obtained as digital signals. On the other hand, in recent years, digital storage has attracted attention for the reasons described below. Namely, when image information is stored as digital signals, it may be maintained without deterioration unlike the case where it is stored in the form of X-ray films. Also, it is possible to store much image information in a small storage space by utilizing a high-density recording medium such as an optical disk.

However, since the amount of information on radiation images is enormous, unlike documents or the like, the storage space is not reduced much by the use of optical disk storage techniques. Further, since the cost of the recording medium is high, the storage cost per image is not so low.

SUMMARY OF THE INVENTION

The primary object of the present invention is to provide a radiation image read-out and image signal storing apparatus wherein information on many radiation images is stored in an image file.

Another object of the present invention is to provide a radiation image read-out and image signal storing apparatus which decreases the information storage space and the filing cost.

The present invention is based on the findings that, in many cases, the irradiation field on a stimulable phosphor sheet is limited to an area smaller than the whole recording area of the stimulable phosphor sheet when the stimulable phosphor sheet is exposed to a radiation passing through an object to have a radiation image of the object stored on the stimulable phosphor sheet. Accordingly, in the present invention, the amount of read-out image signals stored is restricted by avoiding the storage of read-out image signals outside of the irradiation field on an image file.

The present invention provides a radiation image read-out and image signal storing apparatus which includes:

(i) a stimulating ray emission means for emitting stimulating rays onto a stimulable phosphor sheet having a radiation image of an object stored thereon by exposure to a radiation passing through the object, (ii) a light detection means for photoelectrically detecting light emitted by the stimulable phosphor sheet in proportion to the stored radiation energy when the stimulable phosphor sheet is exposed to the stimulating rays, and p (iii) a recording means for storing read-out image signals generated by the light detection means on an image file, wherein the improvement comprises the provision of:

(iv) an irradiation field recognition means for recognizing an irradiation field on said stimulable phosphor sheet, and (v) an image signal selection means positioned between said light detection means and said recording means for receiving irradiation field information generated by said irradiation field recognition means and selecting only the image signals inside of said irradiation field from said readout image signals.

The present invention also provides a radiation image read-out and image signal storing apparatus which includes:

(i) a stimulating ray emission means for emitting stimulating rays onto a stimulable phosphor sheet having a radiation image of an object stored thereon, (ii) a light detection means for photoelectrically detecting light emitted by the stimulable phosphor sheet in proportion to the stored radiation energy when the stimulable phosphor sheet is exposed to the stimulating rays, and (iii) a recording means for storing read-out image signals generated by the light detection means on an image file, wherein the improvement comprises the provision of:

(iv) a histogram creation means for creating a histogram of said read-out image signals, (v) a histogram analysis means for determining a range of said read-out image signals outside of a peak region arising in the vicinity of the maximum signal value and/or the minimum signal value in said histogram, and (vi) an image signal selection means positioned between said light detection means and said recording means for receiving a signal representing said range of said read-out image signals generated by said histogram analysis means and selecting only the image signals within said range from said read-out image signals.

When the radiation image of the object is stored on the stimulable phosphor sheet, the image of a direct radiation impingement region, i.e. the background region where the radiation directly impinges upon the stimulable phosphor sheet without passing through the object, and/or the image of the object portion injected with contrast media is often recorded on the stimulable phosphor sheet. Viewing of the images of the direct radiation impingement region and the object portion injected with contrast media is almost never required, particularly for diagnostic purposes. Since the irradiation amount is particularly high or low at these regions on the stimulable phosphor sheet, the read-out image signals detected at these regions form a peak region in the vicinity of the maximum signal value or the minimum signal value in the histogram. Accordingly, when only the read-out image signals within the range outside of the peak region are stored in the image file, it is possible to avoid storage of the read-out image signals at the background region and the portion injected with contrast media, which are almost never required for viewing, particularly for diagnostic purposes, and to decrease the amount of image signals stored.

In the radiation image read-out and image signal storing apparatus of the present invention, since only the read-out image signals necessary for reproduction of the radiation image of the object are stored on the image file, it becomes possible to store information on many radiation images by use of the image file, to decrease the information storage space by converting the radiation images into electronic information and filing it, and to decrease the filing cost.

DESCRIPTION OF THE PREFERRED EMBODIMENTS

The present invention will hereinbelow be described in further detail with reference to the accompanying drawings.

Figure 1:
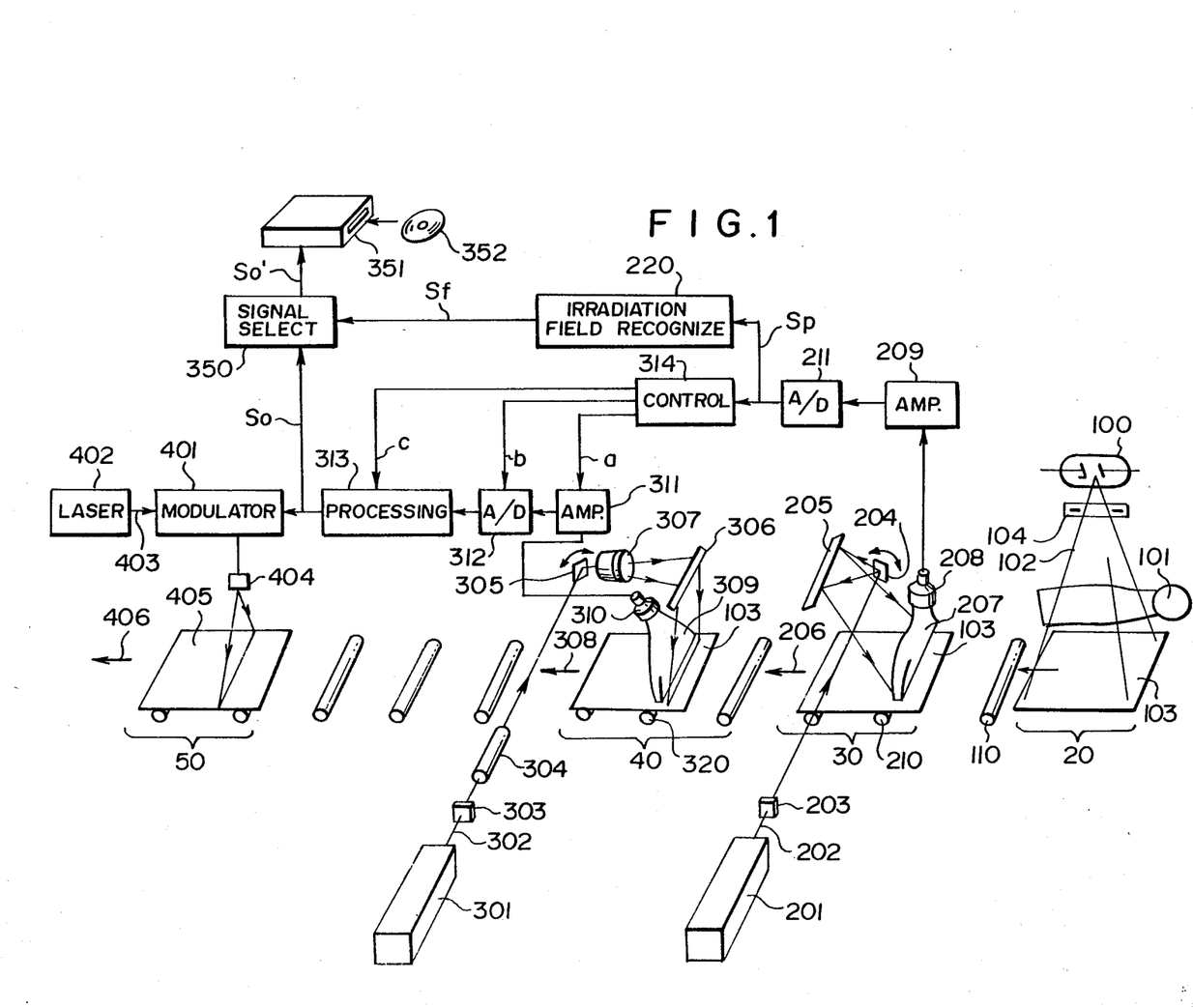
FIG. 1 is a schematic view showing the radiation image recording and reproducing system wherein an embodiment of the radiation image read-out and image signal storing apparatus in accordance with the present invention is employed.

FIG. 1 shows a radiation image recording and reproducing system provided with an embodiment of the radiation image read-out and image signal storing apparatus in accordance with the present invention. Basically, the radiation image recording and reproducing system comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is positioned between the radiation source 100 and the object 101.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanating from a laser beam source 201 is first passed through a filter 203 to cut off light having a wavelength within a range identical with the range of the wavelength of the light emitted by the stimulable phosphor sheet 103 upon stimulation thereof by the laser beam 202. Then, the laser beam 202 is deflected one-dimensionally by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out conducted at the final readout section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into an electric signal carrying the image input information, and amplified by an amplifier 209. The signal generated by the amplifier 209 is digitized by an A/D converter 211, and sent as a preliminary read-out image signal Sp to a final read-out control circuit 314 at the final read-out section 40. On the basis of the image input information represented by the preliminary read-out image signal Sp, the final read-out control circuit 314 calculates a read-out gain setting value (a), a scale factor setting value (b), and a reproduced image processing condition setting value (c). The preliminary read-out image signal Sp is also sent to an irradiation field recognition circuit 220 which will be described in detail later.

After the preliminary read-out is finished, the stimulable phosphor sheet 103 is sent to the final read-out section 40. At this section, a laser beam 302 emitted by a laser beam source 301 is first passed through a filter 303 to cut off light having a wavelength within the range identical with the range of the wavelength of the light emitted by the stimulable phosphor sheet 103 upon stimulation thereof by the laser beam 302. Then, the beam diameter of the laser beam 302 is precisely adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an f$\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. the sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the radiation energy stored therein, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signal is input to an A/D converter 312 which converts the electric signal into a digital signal by use of a scale factor which has been adjusted by the scale factor setting value (b) to suit the amplitude of signal fluctuation. The digital signal thus obtained is sent to a signal processing circuit 313, in which it is processed on the basis of the reproduced image processing condition setting value (c) so as to obtain a radiation image suitable for viewing, particularly for diagnostic purposes, and is output as a read-out image signal (final read-out image signal) So.

The final read-out image signal So generated by the signal processing circuit 313 is input to a light modulator 401 at the image reproducing section 50. At the image reproducing section 50, a laser beam 403 emitted by a reproducing laser beam source 402 is modulated by the light modulator 401 on the basis of the final read-out image signal So received from the signal processing circuit 313, and is made to impinge upon a photosensitive material 405 such as a photographic film by a scanning mirror 404 for scanning of the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signal So is recorded on the photosensitive material 405. For reproducing the radiation image, it is possible to use any other appropriate method such as the aforesaid displaying on a CRT.

In order to store the final read-out image signal So for use in re-examination which will be carried out later, the final read-out image signal So is sent via an image signal selection circuit 350 to an image filing recording device 351 in which the signal So is stored on an image file 352 constituted by an optical disk, a magnetic disk or the like.

Figure 2:
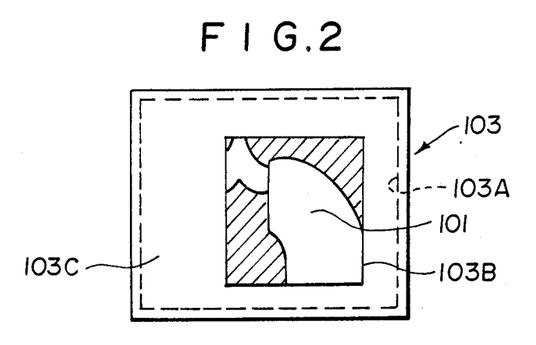
FIG. 2 is a schematic view showing an example of the radiation image stored on the stimulable phosphor sheet.

When the irradiation field stop 104 is operated, for example manually, and the irradiation field is limited, an irradiation field 103B is formed only at a part of an image recording region 103A of the stimulable phosphor sheet 103 as shown in FIG. 2. As described, for example, in U.S. Ser. No. 06/760,862, the irradiation field recognition circuit 220 detects the digital image signals at respective positions on the stimulable phosphor sheet 103 based on the preliminary read-out signal Sp, differentiates the digital image signals, and detects the position of the irradiation field 103B on the basis of the differential value thus obtained. The irradiation field recognition circuit 220 sends an irradiation field signal Sf obtained in this manner and representing the position of the irradiation field 103B to the image signal selection circuit 350. Upon receiving the irradiation field signal Sf, the image signal selection circuit 350 selects an image signal So' only at the image region represented by the irradiation field signal Sf from the aforesaid final read-out image signal So, and inputs the image signal So' to the recording device 351.

Though no information on the object 101 is recorded in a region 103C outside of the irradiation field 103B shown in FIG. 2, image read-out at the final read-out section 40 is carried out over the whole area of the image recording region 103A on the stimulable phosphor sheet 103. Therefore, the final read-out image signal So includes image signals at the region 103C. However, since the image signal selection circuit 350 selects only the image signal So' at the irradiation field 103B and sends it to the recording device 351, the amount of the image signals stored on the image file 352 at the recording device 351 becomes the minimum necessary value for reproducing the radiation image of the object 101. Accordingly, it is possible to store information on more radiation images in the image file 352.

As the irradiation field recognition circuit 220, it is also possible to employ a circuit as described in U.S. Ser. No. 07/195,381 wherein the position of the irradiation field 103B is detected by conversion of the preliminary read-out image signal Sp into two-valued system.

The image file 352 storing the radiation image signal is stored after provision of a retrieval code or the like. To reproduce the radiation image for re-examination or the like, the retrieved image file 352 is sent to an image signal read-out device, and the image signal So' is read out of the image file 352. The image signal read-out device may be independent of the recording device 351 or the recording device 351 may be fabricated to act also as the image signal read-out device. The read-out image signal So' is then input to the image reproducing section 50 or other image reproducing devices to reproduce the radiation image within the region 103B shown in FIG. 2.

In general, the image reproducing section 50 and the image reproducing device are fabricated to record or display the radiation image on a recording film, a display screen, or the like, having a predetermined size corresponding to the size of the stimulable phosphor sheet 103. Therefore, when the image is reproduced based on the image signal So' read out of the image file 352, the image reproducing device should preferably be fabricated to conduct image recording or image display so that the region, i.e. the region 103C in FIG. 2, which the image signal So' does not represent is automatically reproduced to a predetermined density or a predetermined luminance. In this case, it becomes possible to prevent black points and flicker caused by noise component or the like from being recorded or displayed in the region which the image signal So' does not represent.

Figure 3:
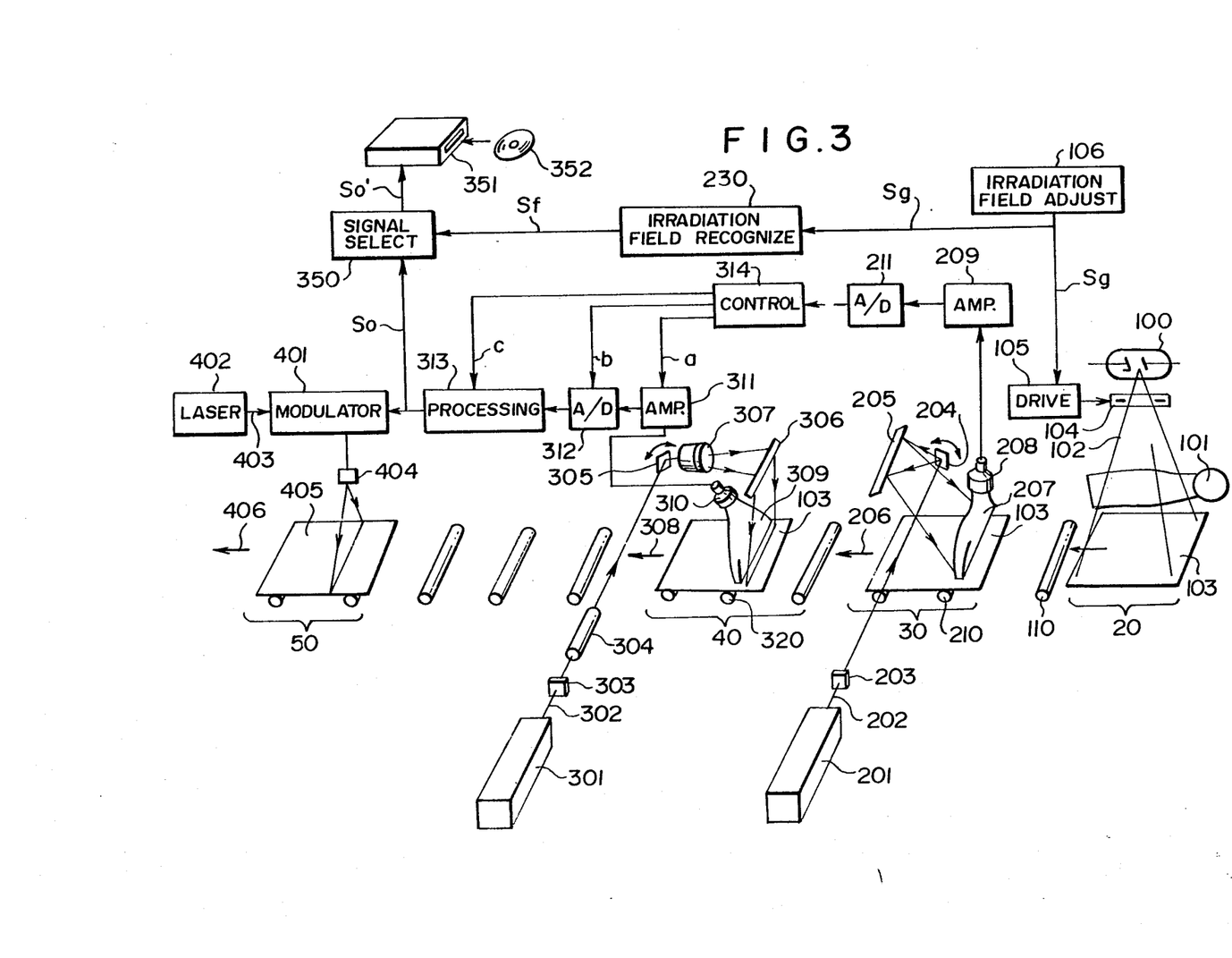
FIG. 3 is a schematic view showing the radiation image recording and reproducing system wherein another embodiment of the radiation image read-out and image signal storing apparatus is employed.

FIG. 3 shows the radiation image recording and reproducing system wherein another embodiment of the radiation image read-out and image signal storing apparatus in accordance with the present invention is employed. In FIG. 3, similar elements are numbered with the same reference numerals with respect to FIG. 1. In FIG. 3, the irradiation field stop 104 at the radiation image recording section 20 is operated by a drive unit 105 which is controlled based on an irradiation field adjusting signal Sg sent from an irradiation field adjusting switch 106 of an apparatus control console or the like. Since the irradiation field adjusting signal Sg corresponds to the irradiation field limiting condition of the irradiation field stop 104, it also corresponds to the irradiation field 103B on the stimulable phosphor sheet 103 as shown in FIG. 2. An irradiation field recognition circuit 230 receives the irradiation field adjusting signal Sg, and detects the position of the irradiation field 103B on the stimulable phosphor sheet 103 based on the signal Sg. The irradiation field recognition circuit 230 sends the irradiation field signal Sf representing the position of the irradiation field 103B to the image signal selection circuit 350. Thereafter, only the selected image signal So' is stored on the image file 352 at the recording device 351 in the same manner as described with reference to FIG. 1.

The present invention is applicable also to a radiation image read-out and image signal storing apparatus wherein the preliminary read-out is not conducted. Specifically, in the apparatus of FIG. 3, since the preliminary read-out conducted at the preliminary read-out section 30 is not related to recognition of the irradiation field, the preliminary read-out section 30 may be omitted. Also in the case where the irradiation field recognition circuit 220 shown in FIG. 1 is used, the final read-out image signal So may be temporarily stored in an image memory simultaneously with the input to the irradiation field recognition circuit 220, and may be read out of the image memory and sent to the image signal selection circuit 350 after the irradiation field is detected by the irradiation field recognition circuit 220. Thus it is possible to omit the preliminary read-out section 30.

Figure 4:
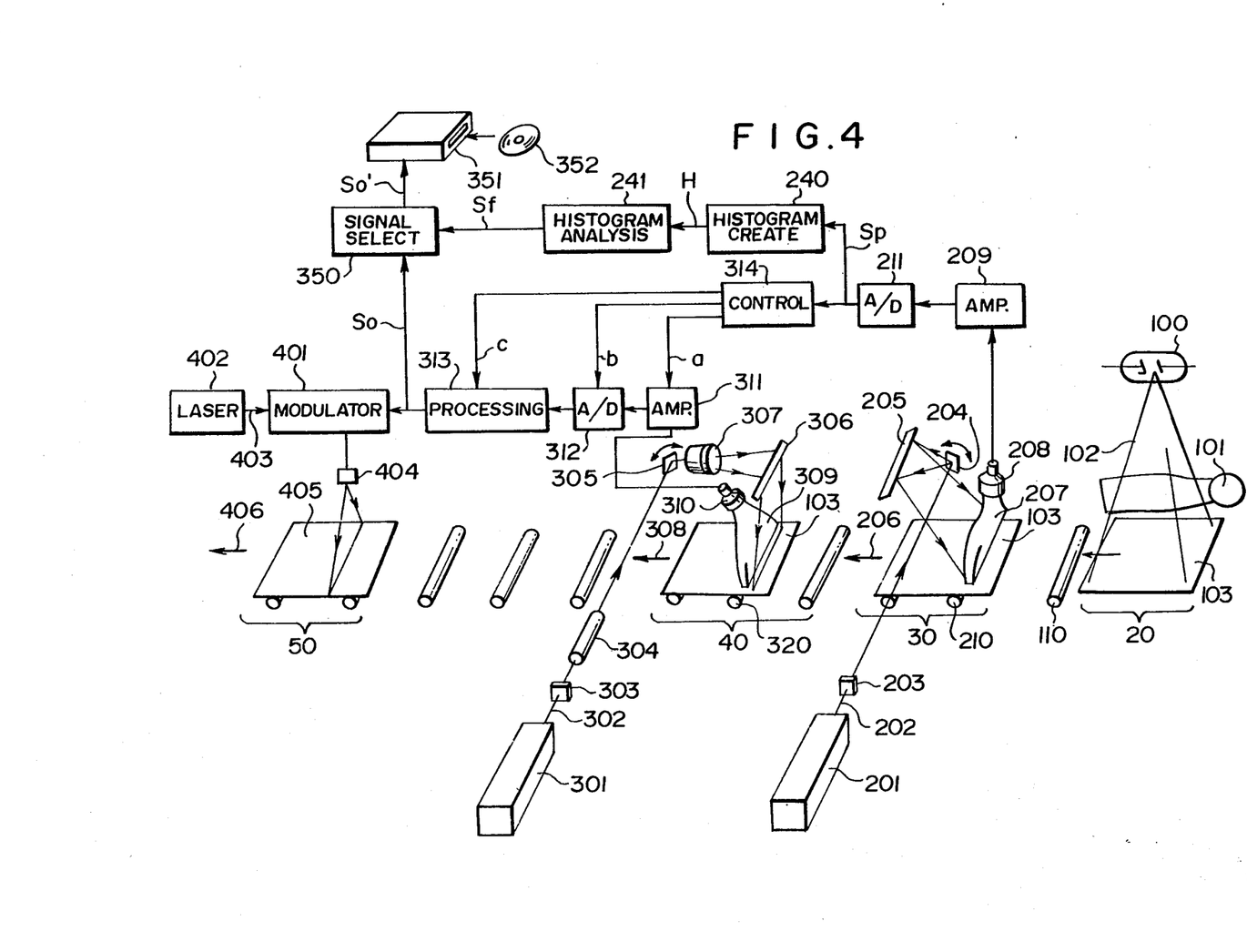
FIG. 4 is a schematic view showing the radiation image recording and reproducing system wherein a further embodiment of the radiation image read-out and image signal storing apparatus in accordance with the present invention is employed.
Figure 5:
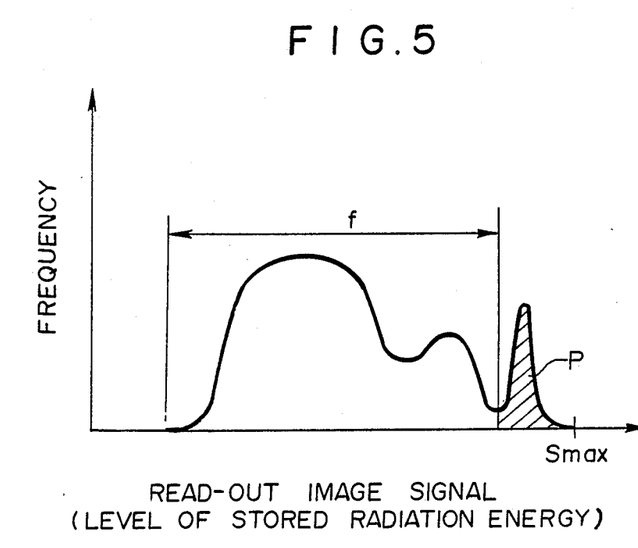
FIGS. 5 and 6 are graphs showing examples of the histogram of the read-out image signals detected from the stimulable phosphor sheet.
Figure 7:
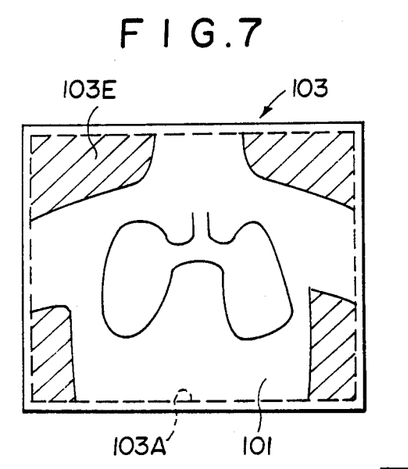
FIGS. 7 and 8 are schematic views showing examples of the radiation image stored on the stimulable phosphor sheet.

FIG. 4 shows a radiation image recording and reproducing system wherein a further embodiment of the radiation image read-out and image signal storing apparatus in accordance with the present invention is employed. In FIG. 4, similar elements are numbered with the same reference numerals with respect to FIG. 1. In this case, the irradiation field stop 104 as shown in FIG. 1 is not provided. The preliminary read-out signal Sp generated by the A/D converter 211 is input to the final read-out control circuit 314 and a histogram creating section 240. The histogram creating section 240 creates a histogram of the preliminary read-out image signal Sp, for example, as shown in FIG. 5, and sends a signal H representing the histogram to a histogram analysis section 241. When a peak region P is present in the vicinity of the maximum signal value Smax in the histogram as shown in FIG. 5, the histogram analysis section 241 detects a read-out image signal range f outside of the peak region P, and sends a signal Sf representing the range f to the image signal selection circuit 350. Upon receiving the signal Sf, the image signal selection circuit 350 selects only the image signal So' within the range f represented by the signal Sf from the final read-out image signal So, and inputs it to the recording device 351. As shown in FIG. 7, when a background region 103E outside of the object 101 is recorded on the stimulable phosphor sheet 103, the level of radiation energy stored at the background region 103E becomes markedly higher than the other regions of the stimulable phosphor sheet 103. That is, the peak region P in the histogram is caused by the preliminary read-out image signal Sp at the background region 103E. Therefore, as mentioned above, the image signal selection circuit 350 selects only the image signal So' at the range f outside of the peak region P, and sends it to the recording device 351.

Also in this embodiment, the image reproducing device should preferably be fabricated to conduct image recording or image display so that the region (background region) which the image signal So' does not represent is automatically reproduced to a predetermined density or a predetermined luminance.

Figure 6:
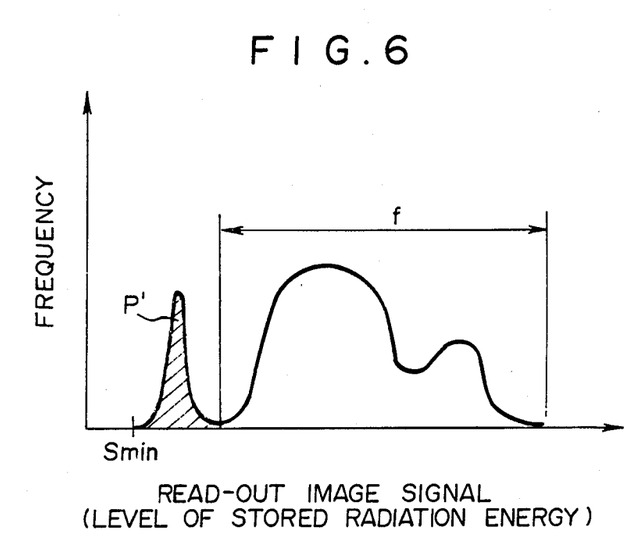
Figure 8:
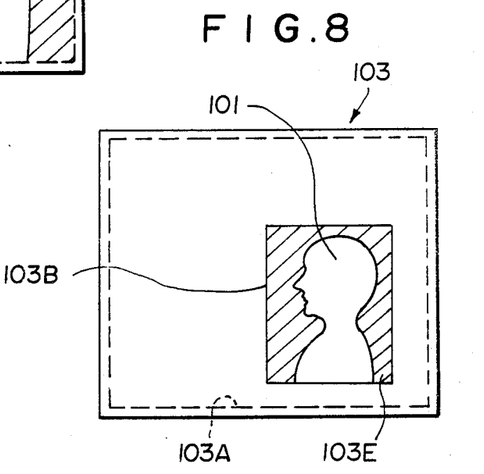

In some cases, an image of an object portion injected with contrast media or an object protector (radiation absorber) may be recorded on the stimulable phosphor sheet 103. Also, the irradiation field 103B may be limited to an area markedly smaller than the image recording region 103A on the stimulable phosphor sheet 103 as shown in FIG. 8. In such cases, the histogram created by the histogram creating section 240 becomes as shown in FIG. 6. That is, a peak region P' is formed in the vicinity of the minimum signal value Smin by the preliminary read-out image signal Sp at a region on the stimulable phosphor sheet 103 where the level of stored radiation energy is markedly low, such as the object portion injected with contrast media, the protector region, or the region unexposed to radiation. However, when the histogram analysis section 241 is constituted to detect the range f outside of the peak region P', it is possible to eliminate storing of the final read-out image signal So at regions unnecessary for reproduction of the radiation image of the object 101, such as the object portion injected with contrast media, and the region unexposed to radiation.

In the embodiment of FIG. 4, the final read-out image signal So may be temporarily stored in an image memory at the same time as the input to the histogram creating section 240, and may be read out of the image memory and sent to the image signal selection circuit 350 after the range f of the final read-out image signal So as shown in FIG. 5 or 6 is detected by the histogram analysis section 241. In this manner, it is possible to omit the preliminary read-out section 30.

In the aforesaid embodiments, the final read-out image signal So is input simultaneously to the image reproducing section 50 and the recording device 351. However, the final read-out image signal so generated by the signal processing circuit 313 may first be stored on the image file 352 at the recording device 351, then read out of the image file 352, and sent to the image reproducing section 50.

We claim:

1. A radiation image read-out and image signal storing apparatus which includes:
   (i) a stimulating ray emission means for emitting stimulating rays onto a stimulable phosphor sheet carrying a radiation image of an object stored thereon,
   (ii) a light detection means for photoelectrically detecting light emitted by the stimulable phosphor sheet in proportion to the stored radiation energy when the stimulable phosphor sheet is exposed to the stimulating rays, and
   (iii) a recording means for storing read-out image signals generated by the light detection means on an image file,
   wherein the improvement comprises the provision of:
   (iv) a histogram creation means for creating a histogram of said read-out image signals,
   (v) a histogram analysis means for determining a range of said read-out image signals outside of a peak region arising in the vicinity of the maximum signal value and/or the minimum signal value in said histogram, and
   (vi) an image signal selection means positioned between said light detection means and said recording means for receiving a signal representing said range of said read-out image signals generated by said histogram analysis means and selecting only the image signals within said range from said read-out image signals.

2. An apparatus as defined in claim 1 wherein said histogram creation means creates the histogram of a preliminary read-out image signal obtained by preliminary read-out carried out prior to final read-out for obtaining the read-out image signal stored in said image file.

3. A radiation image read-out and image signal storing apparatus which includes:
   (i) a stimulating ray emission means for emitting stimulating rays onto a stimulable phosphor sheet carrying a radiation image of an object stored thereon by exposure to a radiation passing through the object,
   (ii) a light detection means for photoelectrically detecting light emitted by the stimulable phosphor sheet in proportion to the stored radiation energy when the stimulable phosphor sheet is exposed to the stimulating rays, and
   (iii) a recording means for storing read-out image signals generated by the light detection means on an image file,
   wherein the improvement comprises the provision of:
   (iv) an irradiation field recognition means for recognizing an irradiation field on said stimulable phosphor sheet based on the image signals generated by said light detection means both inside and outside said irradiation field and
   (v) an image signal selection means positioned between said light detection means and said recording means for receiving irradiation field information generated by said irradiation field recognition means and selecting only the image signals inside of said irradiation field from said read-out image signals, thereby limiting the irradiation field stored.

4. An apparatus as defined in claim 3 wherein said irradiation field recognition means recognizes said irradiation field by processing a preliminary read-out image signal obtained by preliminary read-out carried out prior to final read-out for obtaining the read-out image signal stored on said image file.

5. An apparatus as defined in claim 3 wherein said irradiation field recognition means recognizes said irradiation field by receiving an irradiation field adjusting signal from an irradiation field stop means.

* * * * *